(12) United States Patent
Dimitroff et al.

(10) Patent No.: US 9,282,089 B2
(45) Date of Patent: Mar. 8, 2016

(54) LOW LATENCY AUTHENTICATION OF GATED MEDIA RELAY SERVICES

(71) Applicant: Cisco Technology, Inc., San Jose, CA (US)

(72) Inventors: Michael P. Dimitroff, Sunnyvale, CA (US); Binh Don Ha, Fremont, CA (US); Selim Baygin, Centreville, VA (US); Sunil Kumar Veluvali, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 21 days.

(21) Appl. No.: 14/134,015

(22) Filed: Dec. 19, 2013

(65) Prior Publication Data

US 2015/0180844 A1 Jun. 25, 2015

(51) Int. Cl.
*G06F 7/04* (2006.01)
*H04L 29/06* (2006.01)

(52) U.S. Cl.
CPC .............. *H04L 63/08* (2013.01); *H04L 63/02* (2013.01); *H04L 67/42* (2013.01)

(58) Field of Classification Search
None
See application file for complete search history.

(56) References Cited

U.S. PATENT DOCUMENTS

| 8,554,946 | B2 | 10/2013 | Runeson et al. | |
|---|---|---|---|---|
| 8,572,172 | B2 | 10/2013 | Abuan et al. | |
| 8,588,233 | B1 | 11/2013 | Lohner et al. | |
| 2013/0138822 | A1* | 5/2013 | Hu et al. | 709/227 |
| 2013/0272191 | A1* | 10/2013 | Witzel | 370/315 |

* cited by examiner

*Primary Examiner* — Brandon Hoffman

(57) ABSTRACT

Media relay services are often used to establish sufficiently direct connections in order to enable provisioning of a real-time media service and/or improve the quality of real-time media services. However, media relay services are often gated using authentication systems that add undesirable delay to the delivery and/or access to a real-time media service, which in turn diminish the user experience. By contrast, various implementations disclosed herein include apparatuses, systems, and methods of providing low latency authentication of gated media relay services. For example, in some implementations, a method includes receiving a request for access to a gated media relay service, providing provisional access to the service until an authentication result is available, determining whether the requesting device is authorized to access the media relay service, and at least one of ending or continuing access to the media relay service based on the authentication result.

18 Claims, 5 Drawing Sheets

US 9,282,089 B2

LOW LATENCY AUTHENTICATION OF GATED MEDIA RELAY SERVICES

TECHNICAL FIELD

The present disclosure relates to accessing gated media relay services, and in particular, to authentication systems and methods for gated media relay services.

BACKGROUND

The ongoing development of data networks includes improving the quality of and access to real-time media services that emulate, enhance and/or replace services provided by other systems. For example, voice data call services over data networks are offered as substitutes for voice telephony on public-switched telephone networks (PSTN). The use of data networks allows voice data calls to be enhanced with video and/or other telepresence services that are more difficult, if not impossible, to provide using a PSTN alone.

Real-time media services often rely on direct communication links between endpoints in order to achieve desired performance levels, and in some cases, achieve even provision a usable level of service. As such, a sufficiently direct path between endpoints is preferred for such services. However, in distributed systems, a sufficiently direct path is not always possible. This is especially problematic for voice and video data calls, in which insufficiently direct connections can severely impact call quality or even preclude the provisioning of a real-time media service.

Media relay services are often used to establish sufficiently direct connections in order to enable provisioning of a real-time media service and/or improve the quality of real-time media services between communication endpoints. As a result, once established, voice data calls using media relay services have comparable call quality to PSTN calls. However, media relay services are often gated using an authentication system. Previously available authentication systems add undesirable delay to the delivery and/or access to a real-time media service, which in turn diminish the user experience and undermine the performance goals.

BRIEF DESCRIPTION OF THE FIGURES

So that the present disclosure can be understood by those of ordinary skill in the art, a more detailed description may be had by reference to aspects of some illustrative implementations, some of which are shown in the accompanying drawings.

Figure 1:
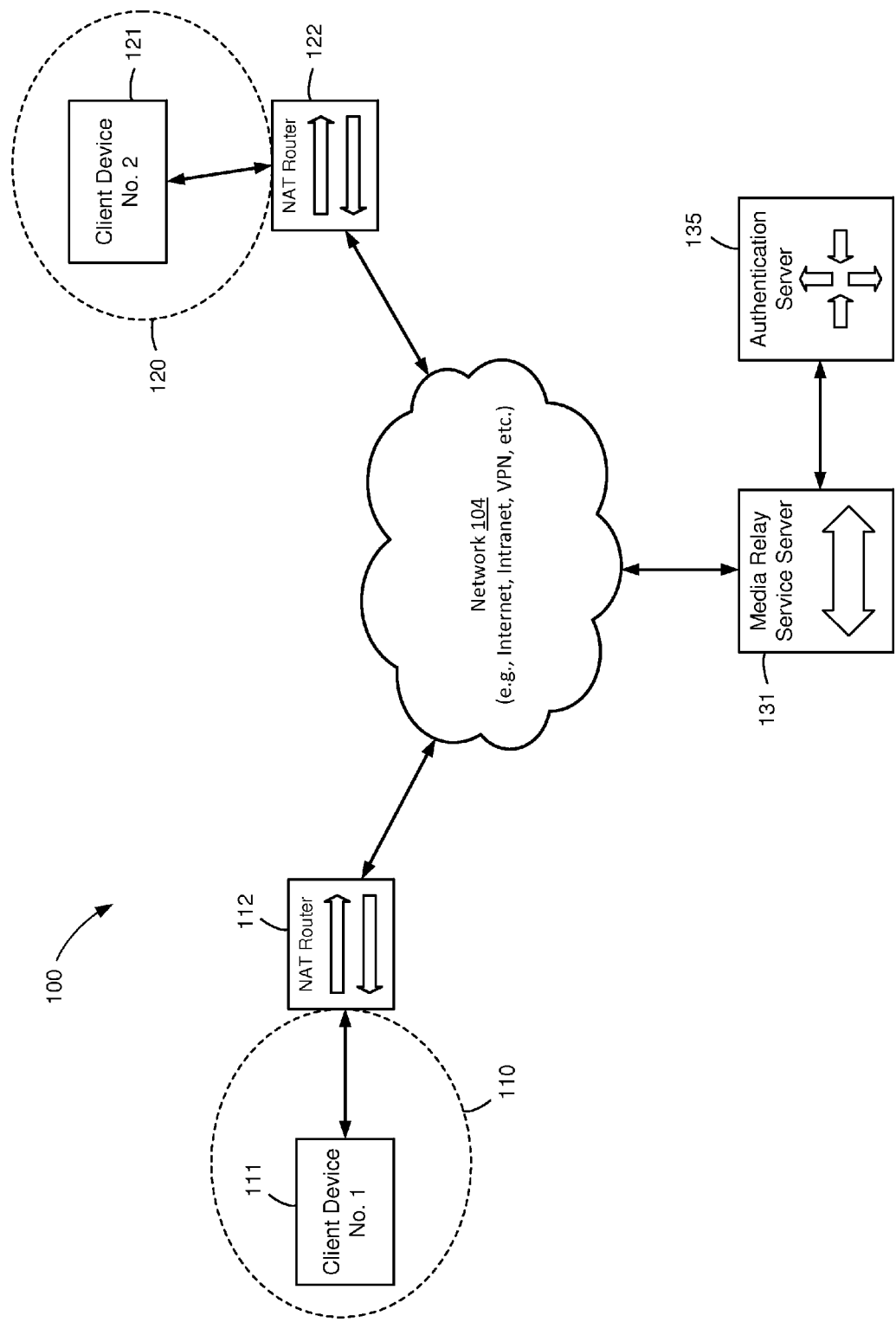
FIG. 1 is a block diagram of a media relay service environment according to some implementations.

In accordance with common practice various features shown in the drawings may not be drawn to scale, as the dimensions of various features may be arbitrarily expanded or reduced for clarity. Moreover, the drawings may not depict all of the aspects and/or variants of a given system, method or device admitted by the specification. Finally, like reference numerals are used to denote like features throughout the specification and figures.

DETAILED DESCRIPTION OF EXAMPLE EMBODIMENTS

Numerous details are described herein in order to provide a thorough understanding of the illustrative implementations shown in the accompanying drawings. However, the accompanying drawings show only some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include apparatuses, systems, and methods for providing low latency authentication of gated media relay services. For example, in some implementations, a method includes receiving a request for access to a gated media relay service, providing provisional access to the service until an authentication result is available, determining whether the requesting device is authorized to access the media relay service, and at least one of ending or continuing access to the media relay service based on the authentication result. In some implementations, the method includes receiving a request for a gated media relay service from a client device, wherein the gated media relay service enables the delivery of a real-time media service; providing the client device provisional access to the media relay service in response to receiving the request for the gated media relay service; and, determining whether or not to prolong or end the provisional access by challenging the authentication credentials of the client device.

FIG. 1 is a simplified block diagram of a media relay service environment 100 in accordance with some implementations. While pertinent features are illustrated, those of ordinary skilled in the art will appreciate from the present disclosure that various other features have not been illustrated for the sake of brevity and so as not to obscure more pertinent aspects of the example implementations disclosed herein. To that end, as a non-limiting example, the media relay service environment 100 includes a network 104, a first LAN (local area network) 110, a second LAN 120, a first NAT (network address translation) router 112, a second NAT router 122, a first client device 111, a second client device 121, a media relay service server 131, and an authentication server 135.

Data communication to and from the first client device 111 is managed within the first LAN 110. Similarly, data communication to and from the second client device 121 is managed within the second LAN 120. Each of the first and second LANs 110, 120 are shown as having only one client device merely for the sake of brevity and convenience. Various implementations include one or more LANs, and that one or more client devices are managed within each LAN. Similarly, even though each of the first and second client devices 111, 121 is referred to in the singular herein, various implementations include a plurality of the first client devices 111 and/or the second client devices 121.

The first and second LANs 110, 120 provide various data and communication services to associated devices (e.g., the respective first and second client devices 111, 121). For example, in some implementations, one or both of the first and second LANs 110, 120 support one or more real-time media services, such as voice data calls or video data calls. As described in more detail below, in some implementations, real-time media services are further supported by the media relay service server 131. As such, the first and second client devices 111, 121 are operative to establish and maintain a real-time media service (e.g., a voice data call) with one another using the media relay service server 131. In some implementations, a real-time transport protocol (RTP) or other suitable protocol is used for the transport of data packets of a media data stream in support of the delivery of the real-time media service.

Each client device 111, 121 includes any suitable computer device, such as a computer, a laptop computer, a tablet device, a netbook, an Internet kiosk, a personal digital assistant, a mobile phone, a smart phone, a gaming device, a computer server, an IP telephone, a telepresence endpoint, or any other computing device. In some implementations, each client device 111, 121 includes one or more processors, one or more types of memory, a display and/or other user interface components such as a keyboard, a touch screen display, a mouse, a track-pad, a digital camera and/or any number of supplemental devices to add functionality.

The first NAT router 112 is provided as a gateway to the first LAN 110 from the network 104. To that end, the first NAT router 112 includes communication interfaces for being communicatively coupled to the network 104 and to one or more devices within the first LAN 110. More specifically, the first NAT router 112 is provided in association with the first LAN 110 to facilitate IP (Internet Protocol) data packet communications for communication devices. In some implementations, the first NAT router 112 allows the first LAN 110 to use one set of IP addresses for IP traffic within the first LAN 110 and a second set of IP addresses for IP traffic external to the first LAN 110. In some implementations, the first NAT router 112 conceals the first set of IP addresses used within the first LAN 110 from devices outside of the first LAN 110 and generally operates as a firewall of the first LAN 110. Additionally, in some implementations, the first NAT router 112 operates to combine multiple connections associated with different devices within the first LAN 110 into a single network flow. The second NAT router 122 is similarly provided as a gateway to the second LAN 120 and performs a similar function to the first NAT router 112 described above. However, in various implementations, the second NAT router 122 is configured differently from the configuration of the first NAT router 122. As a non-limiting example, in some implementations, the first NAT router 112 is configured to conceal internal IP addresses, and the second NAT router 122 is configured to allow external access to the internal IP addresses.

The network 104 can be any local area network (LAN) and/or wide area network (WAN), such as an intranet, an extranet, a virtual private network, or the Internet. In some implementations, it is sufficient that the network 104 provides communication capability between the first and second client devices 111, 121 and the media relay service server 131.

The media relay service server 131 is provided to enable a media relay service that is operable to provide a low-latency authentication process for real-time media services between the first and second client devices 111, 121. For example and without limitation, in some implementations, at least one of voice data calls, video data calls, telepresence services, gaming services, video streaming services, audio streaming services, desktop sharing services, and file transfer services are supported by the media relay service server 131.

The authentication server 135 is configured to gate access to the media relay service server 131 in order to restrict use of the service to authorized users. In operation, a client device is granted prolonged use-access to the media relay service after passing an authentication process. In some implementations, the authentication server 135 is often centralized in a network of distributed client devices, or is merely one of many distributed network elements in an arbitrary position. In some implementations, as shown in FIG. 1, the authentication server 135 is located proximate to the media relay service server 131, which may also be centrally located or located at some arbitrary position in a distributed system. In some implementations, the media relay service server 131 and the authentication server 135 are not collocated, and communicate with one another using at least a portion of the network 104, another network (not shown) and/or a private data link (not shown).

Using previously available authentication processes, the authentication of a client device often requires multiple round-trip exchanges with an authentication server before access is granted. Consequently, the previously available authentication processes add additional latency to the establishment of a real-time media service connection between two client devices. For example, with reference to FIG. 1, in order to setup a voice data call between the first and second client devices 111, 121, the media relay service server 131 would have to receive a positive authentication message from the authentication server 135 before the voice data call is permitted to start. Connection setup delays for voice data calls are unacceptable to users that have become accustomed to and expect almost immediate connectivity for telephone calls on a PSTN. In turn, the adoption of real-time media services on data networks, such as voice data calls, can be hindered by not meeting user expectations for greater responsiveness when using such data services.

By contrast, various implementations described herein include systems, methods and devices that provide a reduced latency authentication process suitable for media relay services that support real-time media services. In some implementations, the media relay service environment 100 includes a subset or superset of the elements illustrated in FIG. 1. So although FIG. 1 shows the media relay service environment 100 as a number of discrete elements, FIG. 1 is intended to serve as more of a functional description of the various features which may be present in the media relay service environment 100 than as a structural schematic of the various implementations. For example, some elements shown separately could be combined and some elements could be further divided into sub-elements or parallel elements. Additionally, some separate elements in FIG. 1 could be implemented by a single server or module and some single elements could be implemented by one or more servers or modules. The actual number of servers in the media relay service environment 100 and how features are allocated among the servers will vary from one implementation to another, and may depend in part on the amount of traffic that the system must handle during peak usage periods as well as during average usage periods. In some implementations, the media relay service server 131 is implemented using a plurality of servers if the media relay service environment 100 manages a large volume of data traffic associated with a large number of client devices. In another example, in some implementations, the functions of the media relay service server 131 and the authentication server 135 are implemented in one standalone device.

Figure 2:
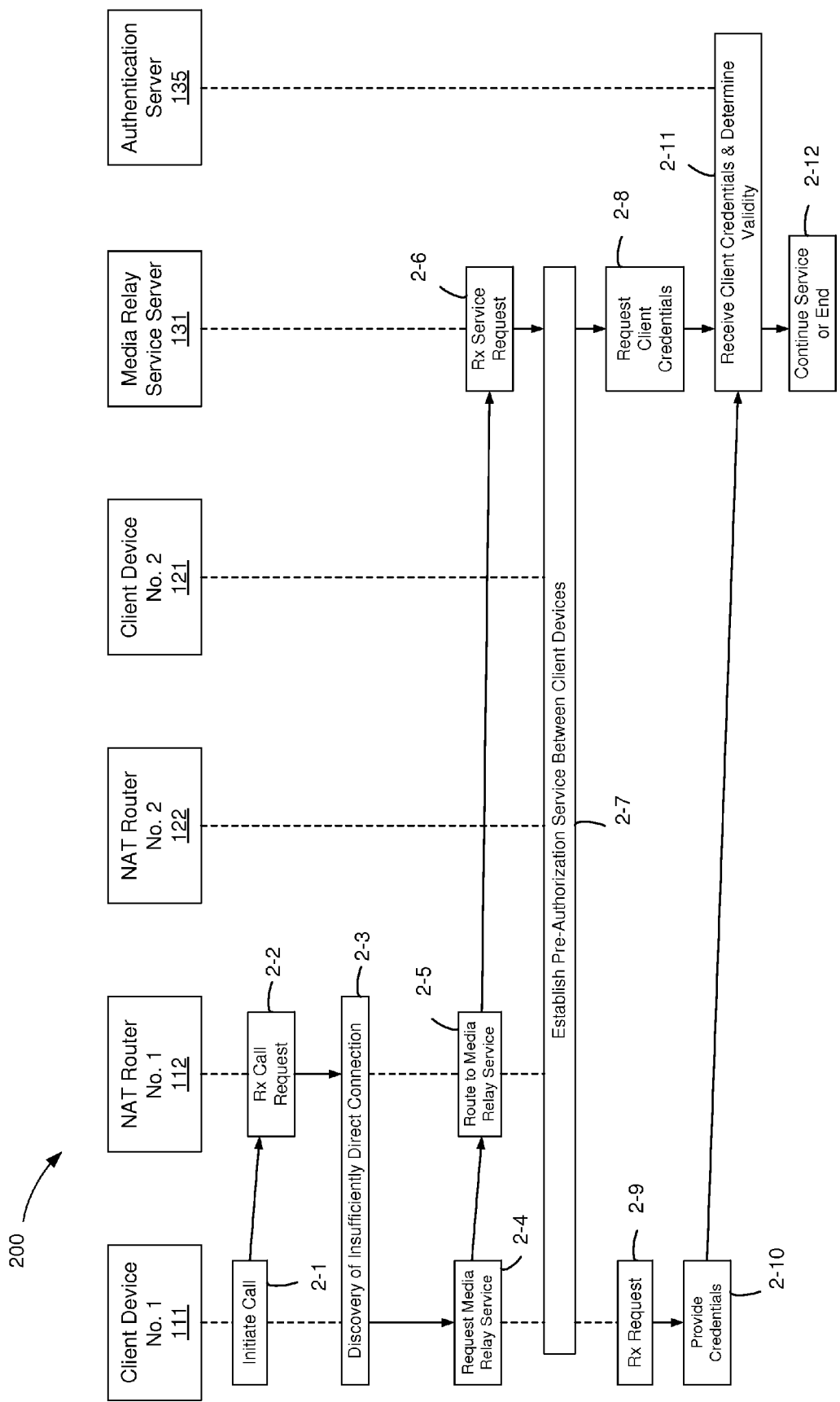
FIG. 2 is a signaling diagram representing aspects of a method of reducing authentication latency in accordance with some implementations.

FIG. 2 shows a signaling diagram 200 of an implementation of a method of reducing authentication latency for media relay services. FIG. 2 includes the network elements of the media relay service environment 100 illustrated in FIG. 1. Elements common to each include common reference numbers, and only the differences between FIGS. 1 and 2 are described herein for the sake of brevity. Moreover, while certain specific features are illustrated, those skilled in the art will appreciate from the present disclosure that various other features have not been illustrated for the sake of brevity and so as not to obscure more pertinent aspects of the example implementations disclosed herein. Moreover, FIG. 2 is described using a voice data call initiation as a non-limiting example of a real-time media service. Those of ordinary skill in the art will appreciate that real-time media services include numerous other services such as, but not limited to, voice data calls, video data calls, telepresence services, gaming services, video streaming services, audio streaming services, desktop sharing services, and file transfer services.

Accordingly, with reference to both FIGS. 1 and 2, as represented by block 2-1, the first client device 111 initiates a voice data call to directed to the second client device 121 by transmitting a call initiation request. As represented by block 2-2, the first NAT router 112 receives the call initiation request. As represented by block 2-3, communication between at least the first NAT router 112 and the first client device 111 informs the first client device that there is not a sufficiently direct communication path to the second client device 121. For example, as disclosed by the Internet Engineering Task Force (IETF) Request form Comments Nos. 5766, 5389 and 5245, those of ordinary skill in the art will appreciate from the present disclosure that there are numerous protocols and existing practices that a client device may use to discover that there is not a sufficiently direct communication path to another device. However, an exhaustive description of such protocols and existing practices is not presented herein, as they are somewhat separate from the more pertinent aspects of the present disclosure.

As represented by block 2-4, the first client device 111 transmits a request to the media relay service server for access to the media relay service, in response to discovering that there is not a sufficient direct communication path to the second client device 121. Those of ordinary skill in the art will appreciate from the present disclosure that in some implementations the call initiation request starts with transmitting a request to the media relay service server for access to the media relay service.

As represented by block 2-5, the first NAT router 112 routes the media relay service request to the media relay service server 131. As represented by block 2-6, the media relay service server 131 receives the routed request. In response, as represented by block 2-7, before confirming the credentials of the first client device 111 using an authentication process, the media relay service server 131 establishes a pre-authentication level of service between the first and second client devices 111, 121. In some implementations, the pre-authentication level of service is substantially the same as the post-authentication level of service. In some implementations, the pre-authentication level of service includes a subset of the service characteristics and/or features provided by in the post-authentication level of service. For example, in some implementations, the pre-authentication level of service for a video data call has lower video quality that the video quality associated with the post-authentication level of service. In another example, in some implementations, the pre-authentication level of service for a gaming service allows a user to setup the start of a game, but blocks the user from starting game play until the authentication process is complete.

As represented by block 2-8, the media relay service server 131 challenges the credentials of the first client device 111 by requesting client device credentials. As represented by block 2-9, the first client device 111 receives the request for the client credentials. In response, as represented by block 2-10, the first client device 111 provides the requested credentials to at least one of the media relay service server 131 and the authentication server 135. In some implementations, the credentials include an encrypted token that is sent back to the IP address associated with the first client device, with instructions for the client device to decode and re-encrypt prior to returning. In some implementations, the user of a client device is prevented from participating in the authentication process (e.g., by providing a password, etc.). To that end, instructions are sent to the requesting client device that causes the requesting client device to block user input during the authentication process. In some implementations, the authentication process is generally concealed from the user, and the authentication process is negotiated between the client device and authentication server 135. To that end, instructions are sent to the requesting client device that causes the requesting client device to conceal the extent of the authentication process from the user.

As represented by block 2-11, at least one of the media relay service server 131 and the authentication server 135 receive the credentials from the first client device 111. The authentication server 135 determines whether or not the credentials are sufficient to permit the first client device 111 to utilize the media relay service. As represented by block 2-12, the access to the media relay service is prolonged or discontinued based on the determination of the authentication server 135.

Figure 3:
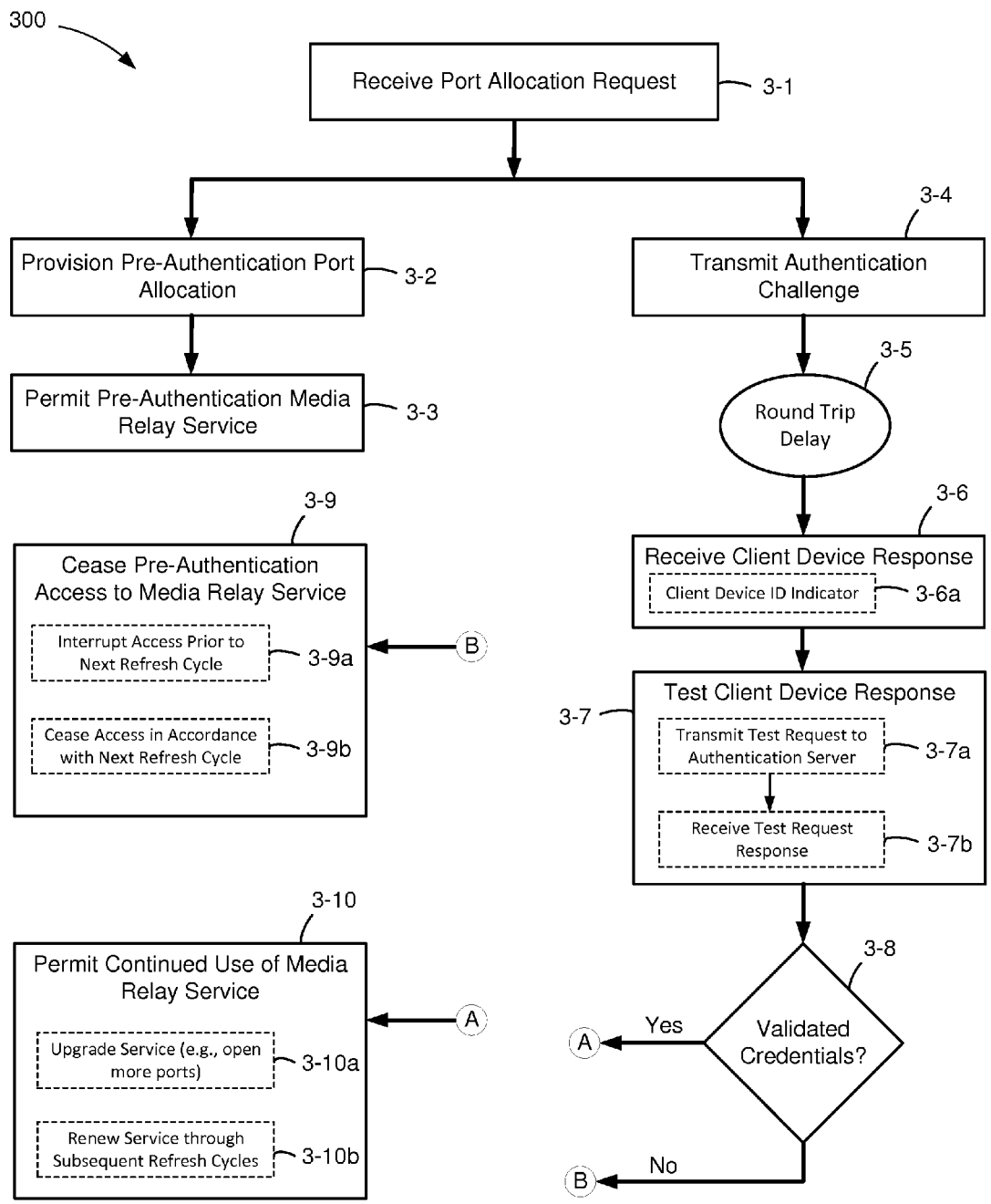
FIG. 3 is a flowchart representation of a server method of reducing authentication latency in accordance with some implementations.

FIG. 3 is a flowchart representation of an implementation of a server (or controller) method 300 of reducing authentication latency. In some implementations, the method 300 is performed by a media relay server. Briefly, method 300 includes receiving a request for access to a media relay service, providing provisional access to the service until an authentication result is available, determining whether the requesting device is authorized to access the media relay service, and at least one of ending or continuing access to the media relay service based on the authentication result. To that end, as represented by block 3-1, the method 300 includes receiving a port allocation request from a client device that is seeking access to the media relay service. For example, with reference to FIG. 1, the media relay service sever 131 receives a port allocation request from the first client device 131 so that the first client device 131 can establish a voice data call to the second client device 121.

In response, the method 300 proceeds along two parallel, but not necessarily simultaneous, branches as follows. Referring to the first branch, as represented by block 3-2 the method 300 includes provisioning a pre-authentication port allocation to the requesting client device. In other words, the media relay service server assigns one or more ports to handle data communications to and from the client device. As represented by block 3-3, the method 300 includes permitting or providing a pre-authentication level of service. As noted above, in some implementations, the pre-authentication level of service is substantially the same as the post-authentication level of service. In some implementations, the pre-authentication level of service includes a subset of the service characteristics and/or features provided by the post-authentication level of service. For example, in some implementations, the pre-authentication level of service for a video data call has lower video quality than the video quality associated with the post-authentication level of service. In another example, the pre-authentication level of service includes a smaller allocation of ports than the post-authentication level of service. In another example, in some implementations, the pre-authentication level of service for a gaming service allows a user to setup the start of a game, but blocks the user from starting game play until the authentication process is complete.

Referring to the second branch, as represented by block 3-4, the method 300 includes transmitting an authentication challenge to the client device. For example, with reference to FIG. 1, one of the media relay service server 131 and the authentication server 135 transmits an authentication challenge to the first client device 111 in response to receiving the port allocation request. After at least one round trip transmission delay represented by block 3-5, as represented by block 3-6, the method 300 includes receiving a client device response. In some implementations, as represented by block 3-6a, a client device response includes a client identification indicator. In some implementations, a client identification indicators includes at least one of a client ID, an encrypted token sent from the server, an IP address and any other data structure that can be used to identify a client device.

As represented by block 3-7, the method 300 includes testing the received client device response to determine whether or not the client device is authorized to use media relay service. In some implementations, as represented by block 3-7a, testing the client device credentials includes making the client device credentials available to an authentication server or authentication module. In some implementations, making the client device credentials available includes at least one of transmitting the client device credentials to an authentication server (or module) and storing the client device credentials in a memory space readable by the authentication server (or module). In response, as represented by block 3-7b, the method 300 includes obtaining a test response from the authentication server or module. In some implementations, obtaining the test response from the authentication server includes at least one of receiving the authentication result from an authentication server (or module) and retrieving the authentication result from a memory space writeable by the authentication server (or module). In some implementations, obtaining the test response includes receiving data from the authentication server that enables the media relay server to determine whether or not the client device is authorized to use media relay service.

As represented by block 3-8, the method 300 includes determining whether or not the client device credentials have been validated by the authentication server or module as indicated by the authentication result. If the credentials have been validated ("Yes" path from block 3-8), as represented by block 3-10, the method 300 includes enabling prolonged use of the media relay service by the client device. In some implementations, as represented by block 3-10a, the method also includes upgrading the level of service accessible by the client device. For example, in some implementations, the client device is allocated more bandwidth and/or provided with access to additional service features. In another example, additional ports are provisioned for use by the client device. In some implementations, as represented by block 3-10b, the method also includes renewing the prolonged access to the media relay service through one or more refresh cycles, for example, without requesting revalidation of the client device credentials or enforcing some other re-gating process.

On the other hand, if the credentials have not been validated ("No" path from block 3-8), as represented by block 3-9, the method 300 includes ceasing the pre-authentication access to the media relay service. In some implementations, as represented by block 3-9a, ceasing access includes interrupting and stopping the use of the media relay service by the client device before the next refresh cycle. In some implementations, as represented by block 3-9b, ceasing access includes waiting for the next refresh cycle to interrupt and stop use of the media relay service by the client device.

Figure 4:
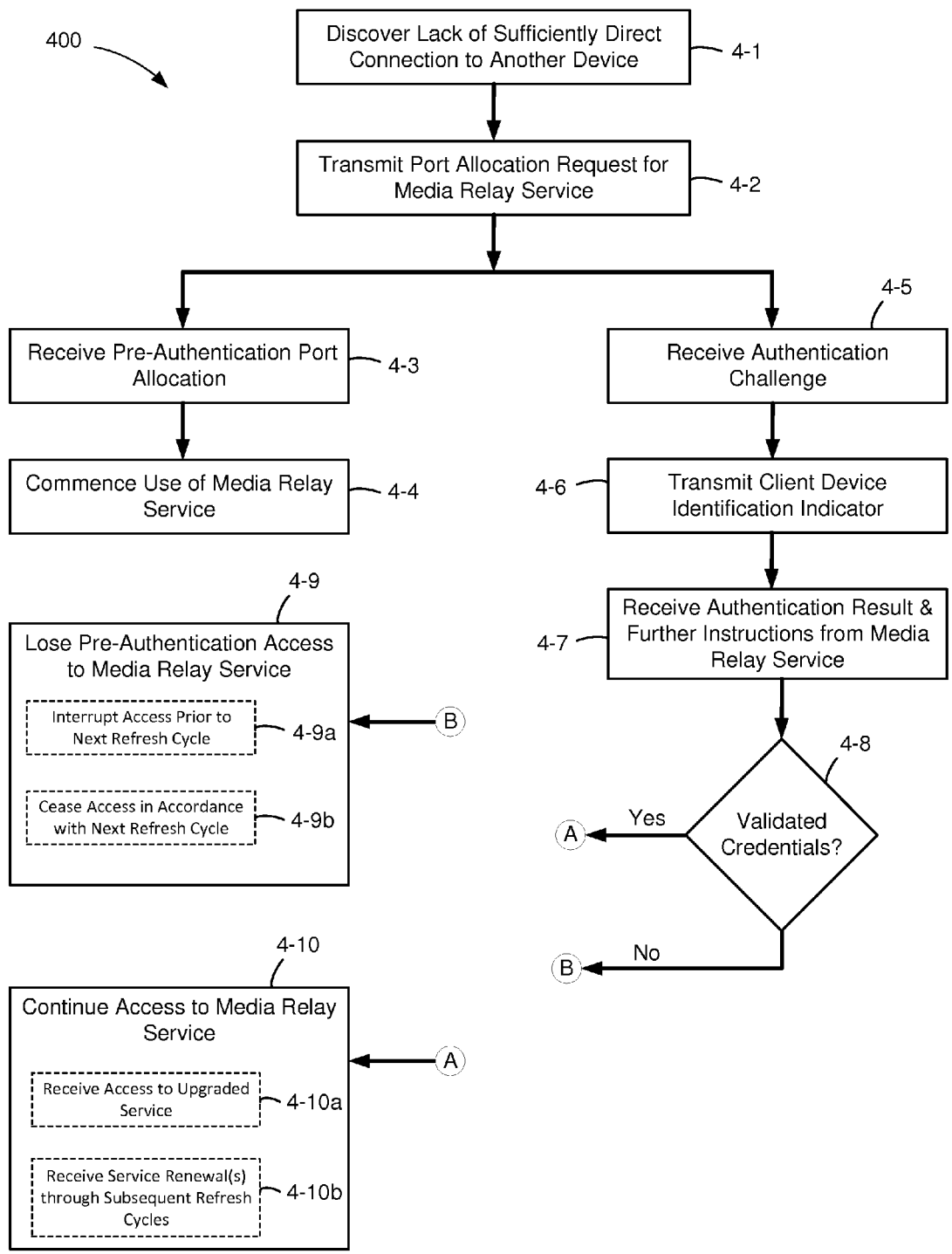
FIG. 4 is a flowchart representation of a client device method of reducing authentication latency in accordance with some implementations.

FIG. 4 is a flowchart representation of a client device method of reducing authentication latency in accordance with some implementations. In some implementations, the method 400 is performed by a client device. Briefly, method 400 includes transmitting a request for access to a media relay service, receiving provisional access to the service until an authentication result is available, and losing or continuing to have access to the media relay service based on the authentication result. To that end, as represented by block 4-1, the method 400 includes discovering that there is not a sufficiently direct connection to another device (e.g., a client device or server). For example, with further reference to FIGS. 1 and 2, the first client device 111 discovers that it is in the first LAN 110, which is gated by the first NAT router 112. In response, as represented by block 4-2, the method 400 includes transmitting a port allocation request to a media relay service server in order to request access to a media relay service.

Subsequently, the method 400 proceeds along two parallel, but not necessarily simultaneous, branches as follows. Referring to the first branch, as represented by block 4-3, the method includes receiving a pre-authentication port allocation from the media relay service server. As represented by block 4-4, the method 400 includes commencing use of a pre-authentication level of service. For example, with reference to FIG. 1, the first client device 111 initiates a voice data call to the second client device 121 through use of the media relay service.

Referring to the second branch, as represented by block 4-5, the method 400 includes receiving an authentication challenge from at least one of a media relay service server and an authentication server or module). For example, again with reference to FIG. 1, the first client device 111 receives an authentication challenge from at least one of the media relay service server 131 and the authentication server 135. In response, as represented by block 4-6, the method 400 includes transmitting the client device credentials, such as an identification indicator. Subsequently, as represented by block 4-7, the method 400 includes receiving an authentication result and further instructions from the media relay service server.

As represented by block 4-8, the method 400 includes determining whether or not the credentials have been validated by the authentication server or module as indicated by the authentication result. If the credentials have been validated ("Yes" path from block 4-8), as represented by block 4-10, the method 400 includes receiving prolonged use of the media relay service. In some implementations, as represented by block 4-10a, the method also includes receiving a level of service upgrade. In some implementations, as represented by block 4-10b, the method also includes receiving the prolonged access to the media relay service through one or more refresh cycles.

On the other hand, if the credentials have not been validated ("No" path from block 4-8), as represented by block 4-9, the method 400 includes losing the pre-authentication access to the media relay service. In some implementations, as represented by block 4-9a, losing access includes having use of the media relay service interrupted and stopped before the next refresh cycle. In some implementations, as represented by block 4-9b, losing access includes continuing to use the media relay service until the next refresh cycle, at which point the service is interrupted and stopped.

Figure 5:
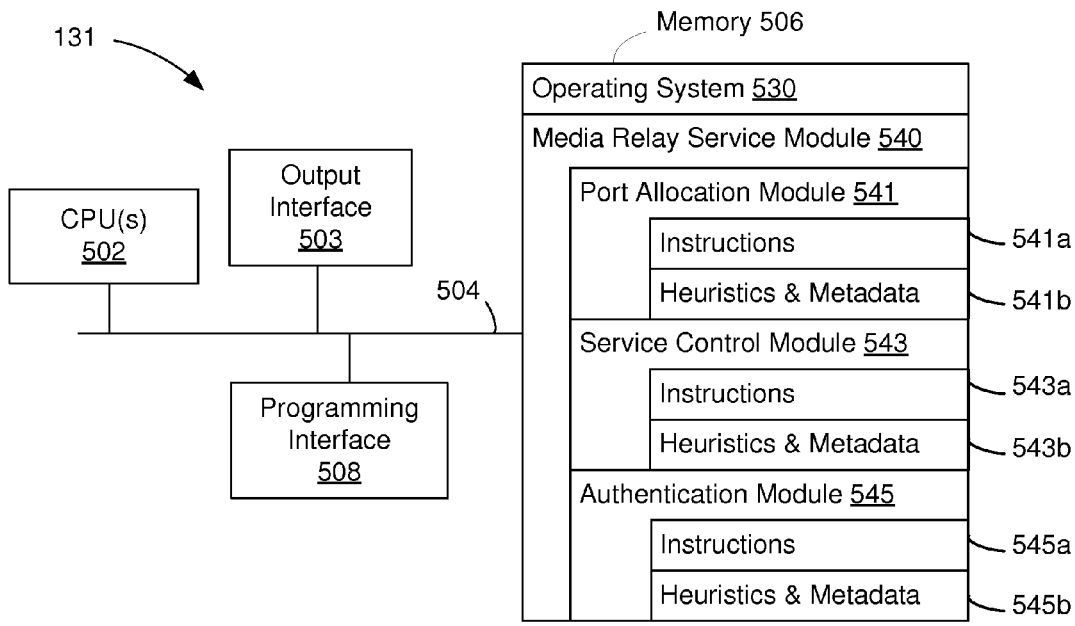
FIG. 5 is a block diagram of a media relay service server in accordance with some implementations.

FIG. 5 is a block diagram of the media relay service server 131 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the media relay service server 131 includes one or more processing units (CPU's) 502, one or more output interfaces 503, a memory 506, a programming interface 508, and one or more communication buses 504 for interconnecting these and various other components.

In some implementations, the communication buses 504 include circuitry that interconnects and controls communications between system components. The memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 506 optionally includes one or more storage devices remotely located from the CPU(s) 502. The memory 506 comprises a non-transitory computer readable storage medium. Moreover, in some implementations, the memory 506 or the non-transitory computer readable storage medium of the memory 506 stores the following programs, modules and data structures, or a subset thereof including an optional operating system 530 and a media relay service module 540. In some implementation, one or more instructions are included in a combination of logic and non-transitory memory.

The operating system 530 includes procedures for handling various basic system services and for performing hardware dependent tasks.

In some implementations, the media relay service module 540 includes a port allocation module 541, a service control module 543, and an authentication module 545.

In some implementations, the port allocation module 541 is configured to allocate a port to a client device in response to the media relay service server 131 receiving a port allocation request. To that end, in some implementations, the port allocation module 541 includes a set of instructions 541a and heuristics and metadata 541b.

In some implementations, the service control module 543 is configured to manage delivery and maintenance of the media relay service to one or more client devices. To that end, in some implementations, the service control module 543 includes a set of instructions 543a and heuristics and metadata 543b.

In some implementations, the authentication module 545 is configured to challenge and validate the credentials of a client device requesting access to the media relay service. To that end, in some implementations, the authentication module 545 includes a set of instructions 545a and heuristics and metadata 545b.

Moreover, FIG. 5 is intended more as functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in various implementations. The actual number of modules and the division of particular functions and how features are allocated among them will vary from one implementation to another, and may depend in part on the particular combination of hardware, software and/or firmware chosen for a particular implementation.

Figure 6:
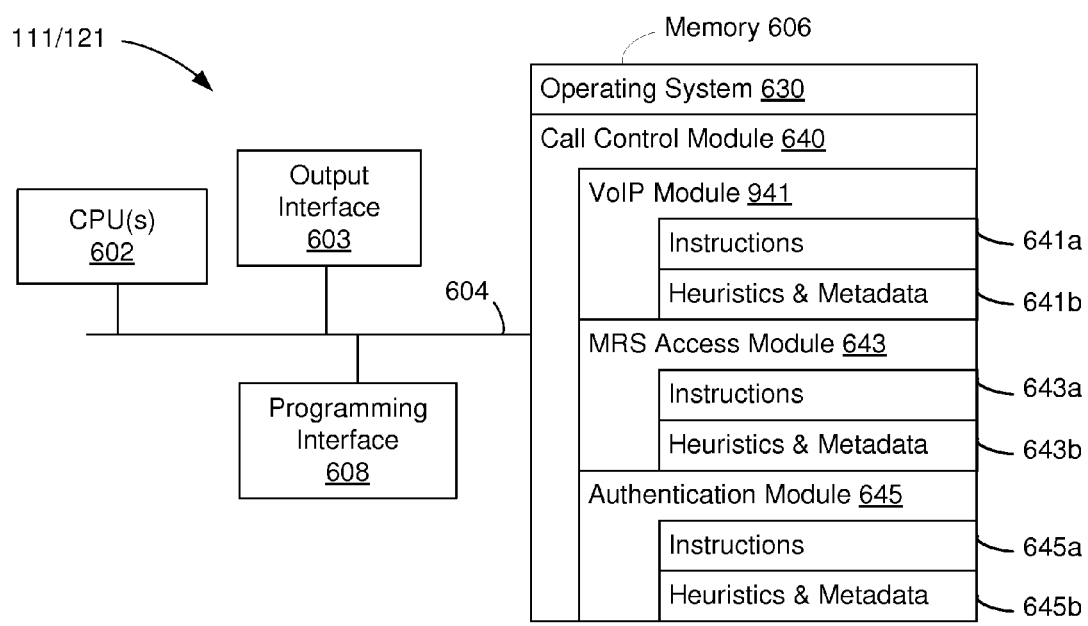
FIG. 6 is a block diagram of a client device in accordance with some implementations.

FIG. 6 is a block diagram of a client device 111/121 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the client device 111/121 includes one or more processing units (CPU's) 602, one or more output interfaces 603, a memory 606, a programming interface 608, and one or more communication buses 604 for interconnecting these and various other components.

In some implementations, the communication buses 604 include circuitry that interconnects and controls communications between system components. The memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606 comprises a non-transitory computer readable storage medium. Moreover, in some implementations, the memory 606 or the non-transitory computer readable storage medium of the memory 606 stores the following programs, modules and data structures, or a subset thereof including an optional operating system 630 and a voice data call control module 640 (and/or another real-time media service module). In some implementation, one or more instructions are included in a combination of logic and non-transitory memory.

The operating system 630 includes procedures for handling various basic system services and for performing hardware dependent tasks.

In some implementations, the voice data call control module 640 includes a VoIP module 641, a media relay service access module 643, and an authentication module 645.

In some implementations, the VoIP module 641 is configured to initiate voice data calls from the client device 111/121. To that end, in some implementations, the VoIP module 641 includes a set of instructions 641a and heuristics and metadata 641b.

In some implementations, the media relay service access module 643 is configured to request and locally manage access to the media relay service. To that end, in some implementations, the media relay service access module 643 includes a set of instructions 643a and heuristics and metadata 643b.

In some implementations, the authentication module 645 is configured to locally negotiate the client side of an authentication process. To that end, in some implementations, the authentication module 645 includes a set of instructions 645a and heuristics and metadata 645b.

Moreover, FIG. 6 is intended more as functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various implementations. The actual number of modules and the division of particular functions and how features are allocated among them will vary from one implementation to another, and may depend in part on the particular combination of hardware, software and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   receiving a request for a gated media relay service from a client device, wherein the gated media relay service enables the delivery of a real-time media service that is reserved for client devices that satisfy one or more criteria of an authentication process;
   providing the client device provisional access to the media relay service in response to receiving the request for the gated media relay service, wherein provisional access allows the client device to use the real-time media service provided through the gate media relay service, wherein providing the provisional access to the media relay service includes providing the client device a pre-authentication level of service that is substantially independent from the validity of an identification indicator of the client device; and
   determining whether or not to prolong or end the provisional access by challenging the authentication credentials of the client device.

2. The method of claim 1, further comprising:
   transmitting an authentication challenge to the client device in response to receiving the request for the gated media relay service; and
   receiving identification indicator from the client device.

3. The method of claim 1, wherein the request for the gated media relay service includes a request for a port allocation.

4. The method of claim 1, wherein the pre-authentication level of service includes a subset of the service characteristics and/or features provided by a post-authentication level of service.

5. The method of claim 1, wherein the pre-authentication level of service is substantially equivalent to a post-authentication level of service.

6. The method of claim 1, wherein ending the provisional access to the gated media relay service includes at least one of interrupting the provisional access prior to an upcoming refresh cycle and ceasing access in accordance with the upcoming refresh cycle.

7. The method of claim 1, wherein prolonging the provisional access to the gated media relay service includes at least one of upgrading a level of service and renewing a level of service through one or more subsequent refresh cycles.

8. The method of claim 1, wherein challenging the authentication credentials of the client device comprises:
   transmitting a challenge message to the client device in response to receiving the request for the gated media relay service; and
   receiving identification indicator from the client device.

9. Software encoded on a non-transitory memory, the software including instructions that when executed are operable to:
   receive a request for a gated media relay service from a client device, wherein the gated media relay service enables the delivery of a real-time media service by providing a low latency authentication process to the real-time media service;
   provide the client device provisional access to the media relay service in response to receiving the request for the gated media relay service, wherein provisional access allows the client device to use the real-time media service provided through the gate media relay service, wherein providing the provisional access to the media relay service includes providing the client device a pre-authentication level of service that is substantially independent from the validity of an identification indicator of the client device; and
   determine whether or not to prolong or end the provisional access by challenging the authentication credentials of the client device.

10. The software of claim 9, further including instructions that executed are operable to:

transmit an authentication challenge to the client device in response to receiving the request for the gated media relay service; and receive identification indicator from the client device.

11. The software of claim 9, wherein the request for the gated media relay service includes a request for a port allocation.

12. The software of claim 9, wherein the pre-authentication level of service includes a subset of the service characteristics and/or features provided by a post-authentication level of service.

13. The software of claim 9, wherein the pre-authentication level of service is substantially equivalent to a post-authentication level of service.

14. The software of claim 9, wherein ending the provisional access to the gated media relay service includes at least one of interrupting the provisional access prior to an upcoming refresh cycle and ceasing access in accordance with the upcoming refresh cycle.

15. The software of claim 9, wherein prolonging the provisional access to the gated media relay service includes at least one of upgrading a level of service and renewing a level of service through one or more subsequent refresh cycles.

16. A system comprising:
a processor; and
a combination of logic and non-transitory memory including instructions, that when at least executed in part by the processor cause the system to:

receive a request for a gated media relay service from a client device, wherein the gated media relay service enables the delivery of a real-time media service by providing a low latency authentication process to the real-time media service;

provide the client device provisional access to the media relay service in response to receiving the request for the gated media relay service, wherein provisional access allows the client device to use the real-time media service provided through the gate media relay service, wherein providing the provisional access to the media relay service includes providing the client device a pre-authentication level of service that is substantially independent from the validity of an identification indicator of the client device; and determine whether or not to prolong or end the provisional access by challenging the authentication credentials of the client device.

17. The system of claim 16 comprising a media relay service server providing at least in part one or more real-time media services.

18. The system of claim 17, wherein the one or more real-time media services include at least one of voice data calls, video data calls, telepresence services, gaming services, video streaming services, audio streaming services, desktop sharing services, and file transfer services.

* * * * *